US008363926B2

(12) United States Patent
Khan et al.

(10) Patent No.: US 8,363,926 B2
(45) Date of Patent: Jan. 29, 2013

(54) SYSTEMS AND METHODS FOR MODELING THREE-DIMENSIONAL OBJECTS FROM TWO-DIMENSIONAL IMAGES

(75) Inventors: Saad M. Khan, Hamilton, NJ (US); Pingkun Yan, Peekskill, NY (US); Mubarak Shah, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 1030 days.

(21) Appl. No.: 12/366,241

(22) Filed: Feb. 5, 2009

(65) Prior Publication Data
US 2009/0304265 A1 Dec. 10, 2009

Related U.S. Application Data

(60) Provisional application No. 61/026,561, filed on Feb. 6, 2008.

(51) Int. Cl.
*G06K 9/36* (2006.01)
*G06T 15/00* (2011.01)

(52) U.S. Cl. ............ 382/154; 382/285; 345/419

(58) Field of Classification Search .......... 382/131, 382/242, 238, 203, 154, 285; 345/419, 163; 600/425; 359/9, 22, 23; 375/E7.081, E7.228, 375/E13.014, E13.019, E13.023, E13.025, 375/E13.033, E13.04, E13.044, E13.059, 375/E13.067, E13.071, E13.072, E13.073, 375/E13.038, 240.14; 707/999.002
See application file for complete search history.

(56) References Cited

U.S. PATENT DOCUMENTS

| | | | |
|---|---|---|---|
| 6,996,256 B2* | 2/2006 | Pavlidis | 382/118 |
| 6,996,265 B1* | 2/2006 | Patnaik | 382/149 |
| 7,558,762 B2* | 7/2009 | Owechko et al. | 706/14 |
| 2008/0211809 A1* | 9/2008 | Kim et al. | 345/420 |

OTHER PUBLICATIONS

Khan et al., "A Homographic Framework for the Fusion of Multi-view Silhouettes" IEEE ICCV 2007.*
Grauman, et al., "A Bayesian Approach to Image-Based Visual Hull Reconstruction." Mass. Institute of Technology, Proceedings of the 2003 IEEE Computer Society Conference on Computer Vision and Pattern Recognition, pp. 1-8.
Kutulakos, et al. "A theory of Shape by Space Carving." International Journal of Computer Vision 38(3), 2000. Pages ri 199-218.
Franco, et al. "Fusion of Multi-View Silhouette Cues Using a Space Occupancy Grid."Proceedings of the Tenth IEEE International Conference on Computer Vision, 2005.
Aldo Laurentini, "The Visual Hull Concept for Silhouette-Based Image Understanding." IEEE Transactions on Pattern Analysis and Machine Intelligence, vol. 16, No. 2, Feb. 1994, pp. 150-162.
Broadhurst, et al. "A Probabilistic Framework for Space Carving." University of Cambridge, Dept. of Engineering, 2001, pp. 388-393.
Criminisi, et al. "Single View Metrology." University of Oxford, Dept. of Engineering Science, International Journal of Computer Vision, Nov. 2000.

* cited by examiner

*Primary Examiner* — Sheela Chawan
(74) *Attorney, Agent, or Firm* — Thomas | Horstemeyer, LLP

(57) ABSTRACT

In one embodiment, a system and method for modeling a three-dimensional object includes capturing two-dimensional images of the object from multiple different viewpoints to obtain multiple views of the object, estimating slices of the object that lie in parallel planes that cut through the object, and computing a surface of the object from the estimated slices.

28 Claims, 8 Drawing Sheets

US 8,363,926 B2

SYSTEMS AND METHODS FOR MODELING THREE-DIMENSIONAL OBJECTS FROM TWO-DIMENSIONAL IMAGES

CROSS-REFERENCE TO RELATED APPLICATION

This application claims priority to U.S. provisional application entitled "A Homographic Framework for the Fusion of Multi-View Silhouettes" having Ser. No. 61/026,561, filed Feb. 6, 2008, which is entirely incorporated herein by reference.

NOTICE OF GOVERNMENT-SPONSORED RESEARCH

This invention was made with Government support under Contract/Grant No.: NBCHCOB0105, awarded by the U.S. Government VACE program. The Government has certain rights in the claimed inventions.

BACKGROUND

Three-dimensional modeling is useful in various applications, including object localization, object recognition, and motion capture. There are a variety of methods that are currently used to model three-dimensional objects. One such method is a visual hull-based method in which silhouette information from two-dimensional images taken from multiple views in three-dimensional space are fused. Although such methods are viable, they typically require camera calibration, which is cumbersome. It would be desirable to be able to model three-dimensional objects from two-dimensional images without having to perform such calibration.

BRIEF DESCRIPTION OF THE FIGURES

The present disclosure may be better understood with reference to the following figures. Matching reference numerals designate corresponding parts throughout the figures, which are not necessarily drawn to scale.

DETAILED DESCRIPTION

Introduction

Disclosed herein are systems and methods for three-dimensional modeling using a purely image-based approach to fusing foreground silhouette information from multiple two-dimensional views. Unlike prior solutions, three-dimensional constructs such as camera calibration are unnecessary.

As described in greater detail below, visual hull intersection is performed in the image plane using planar homographies and foreground likelihood information from a set of arbitrary views of an object. A two-dimensional grid of object occupancy likelihoods is generated representing a cross-sectional slice of the object. Subsequent slices of the object are obtained by extending the process to planes parallel to a reference plane in a direction along the body of the object. Occupancy grids are then stacked on top of each other, creating a three-dimensional data structure that encapsulates the object shape and location. Finally, the object structure is segmented out by minimizing an energy function over the surface of the object in a level sets formulation.

The problem of determining a slice of an object can be stated as finding the region on a hypothetical plane that is occupied by the object. Through homographic warping of silhouette information from multiple views to a reference view, visual hull intersection on a plane can be achieved. If foreground information is available in each view, the process delivers a two-dimensional grid of space occupancies: a representation of a slice of the object cut out by the plane. Starting with homographies between views due to a reference plane in the scene (e.g., a ground plane), homographies of successively parallel planes can be obtained in the framework of plane-to-plane homographies using the vanishing point of the reference direction (the direction not parallel to the reference plane). With those homographies, an arbitrary number of occupancy grids/slices along the body of the object can be obtained, each being a discrete sampling of three-dimensional space of object occupancies.

Discussion of the Modeling Approach

Figure 1:
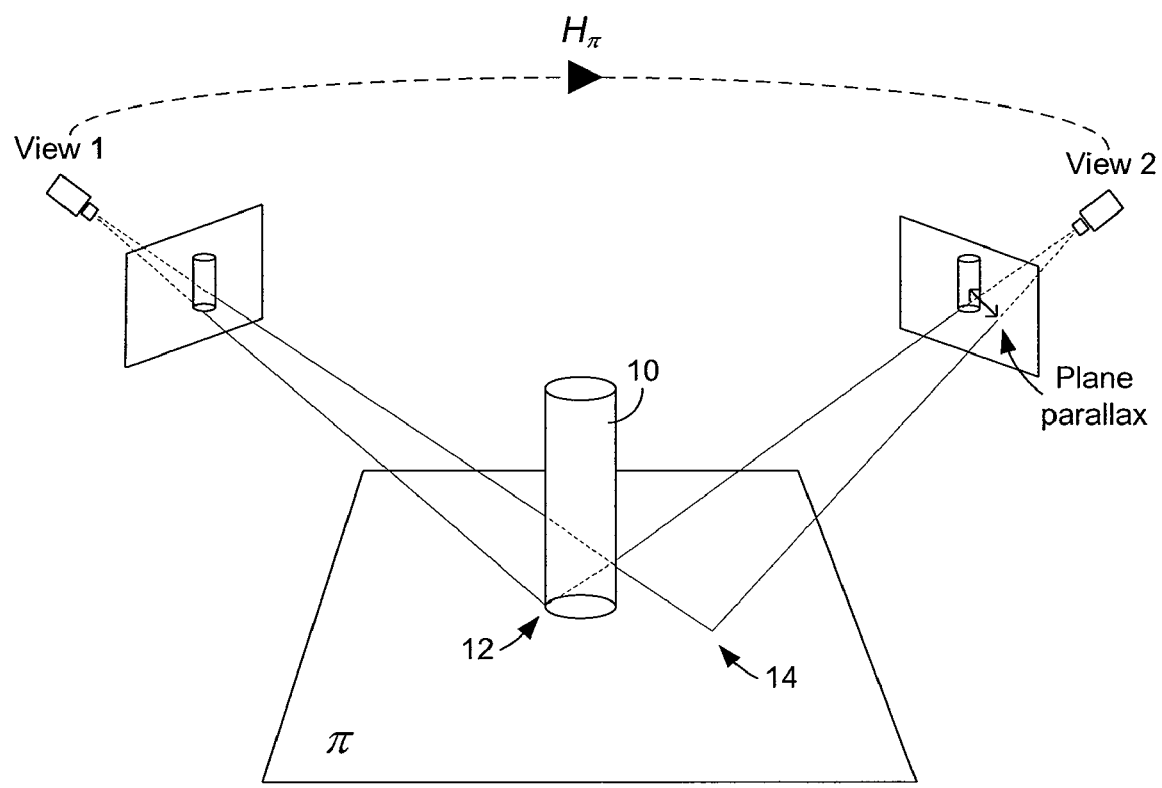
FIG. 1 is a diagram that schematically illustrates a homography induced by a planar surface between two views of an object.

Planar homographies will first be discussed in relation to FIG. 1, which illustrates a scene occupied by a cylinder 10. Assume x=(x, y, 1) denotes the image location (in homogeneous coordinates) of a three-dimensional scene point in a first view, View 1, and x'=(x', y', 1) are the coordinates of the scene point in a second view, View 2. Let $H_\pi$ denote the homography between the two views with respect to a scene plane $\pi$. Warping View 1 onto View 2 using $H_\pi$, the point x is transformed to $x_w$, where $x_w=[H_\pi]x$. For scene points on plane $\pi$, $x_w=x'$, while for scene points off plane $\pi$, $x_w \neq x'$. The misalignment $x_w-x'$ is called the plane parallax. Geometrically speaking, warping x from the View 1 to View 2 using homography H, amounts to projecting a ray from the camera center of View 1 through the scene point at location x and extending it until it intersects the plane $H_\pi$ at a point often referred to as the "piercing point" of x with respect to plane $H_\pi$. The ray is then projected from the piercing point onto the second view. The point in the image plane of the second view that the ray intersects is $x_w$. In effect, $x_w$ is the location at which the image of the piercing point is formed in the second camera. This phenomenon is illustrated by piercing points 12 and 14 in FIG. 1. As can be seen from that figure, scene points on the plane $\pi$ have no plane parallax, while those off the plane have considerable plane parallax. Using these concepts, cross-sectional slices of the visual hull cut out by arbitrary planes in the scene can be obtained by the homographic fusion of multiple silhouettes onto a reference view.

Figure 2A:
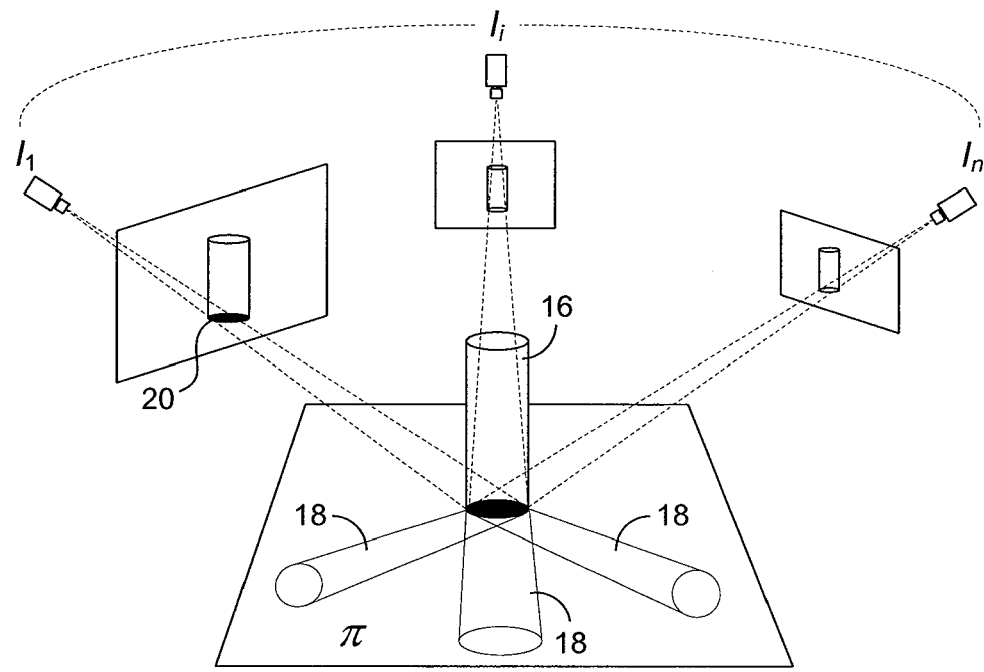
FIG. 2A is a diagram that schematically illustrates warping silhouettes of an object to a reference view using a planar homography induced by a first plane.

FIG. 2A illustrates a scene containing a cylinder 16 that is viewed from several angles. The view $I_1$ is chosen as the reference view, although any of the views could be selected. By warping view $I_1$ to the reference view $I_1$ using homography $H_{i_{\pi},1}$ induced by scene plane $\pi$, every foreground pixel in $I_i$ is projected to its piercing point on $\pi$. This process can be visualized as the foreground object casting a shadow on $\pi$ (an analogy if the cameras are replaced by point light sources), as depicted by the shadow regions 18 in FIG. 2A. The shadow is then projected onto the reference view $I_1$ to complete the operation of the homographic warping.

Computing the shadow is equivalent to determining the region on plane $\pi$ that falls inside the visual hull of the object image in $I_i$. The fusion of these shadows projected from various views therefore amounts to performing visual hull intersection on plane $\pi$, depicted by the region 20 in FIG. 2A. This process is performed implicitly, when all of the views are warped onto the reference view $I_1$ and fused to obtain the region 20 in the reference view $I_1$. Without loss of generality, the image plane of reference view $I_1$ after homographic fusion of foreground data can be viewed as a projectively transformed planar slice of the object (strictly speaking a perspectivity with only 6 degrees of freedom).

Instead of using binary foreground maps, a more statistical approach can be pursued and the background can be modeled in each view to obtain foreground likelihood maps, thereby using cameras as statistical occupancy sensors (foreground interpreted as occupancy in space). In the case of non-stationary cameras, object detection is achieved in a plane+parallax framework assigning high foreground likelihood where there is high motion parallax. A reason to adopt a soft approach is to delay the act of thresholding preventing any premature decisions on pixel labeling; an approach that has proven to be very useful in visual hull methods due to their susceptibility to segmentation and calibration errors. Assume that $I_i$ is the foreground likelihood map (each pixel value is likelihood of being foreground) in view i of n. Consider a reference plane $\pi$ in the scene inducing homographies $H_{i,j}$, from view i to view j. Warping $I_i$'s to a reference view $I_{ref}$, the warped foreground likelihood maps are: $\hat{I}_i = [H_{i_{\pi},ref}]I_i$.

Visual hull intersection on $\pi$ (AND-fusion of the shadow regions) is achieved by multiplying these warped foreground likelihood maps:

$$\theta_{ref} = \prod_{i=1}^{n} \hat{I}_i, \qquad [\text{Equation 1}]$$

where $\theta_{ref}$ is the projectively transformed grid of object occupancy likelihoods. Notably, a more elaborate fusion model can be used at the expense of simplicity. For instance, a sensor fusion strategy that explicitly models pixel visibility, sensor reliability, or scene radiance can be transparently incorporated without affecting the underlying approach of fusing at slices in the image plane rather than in three-dimensional space.

Figure 2B:
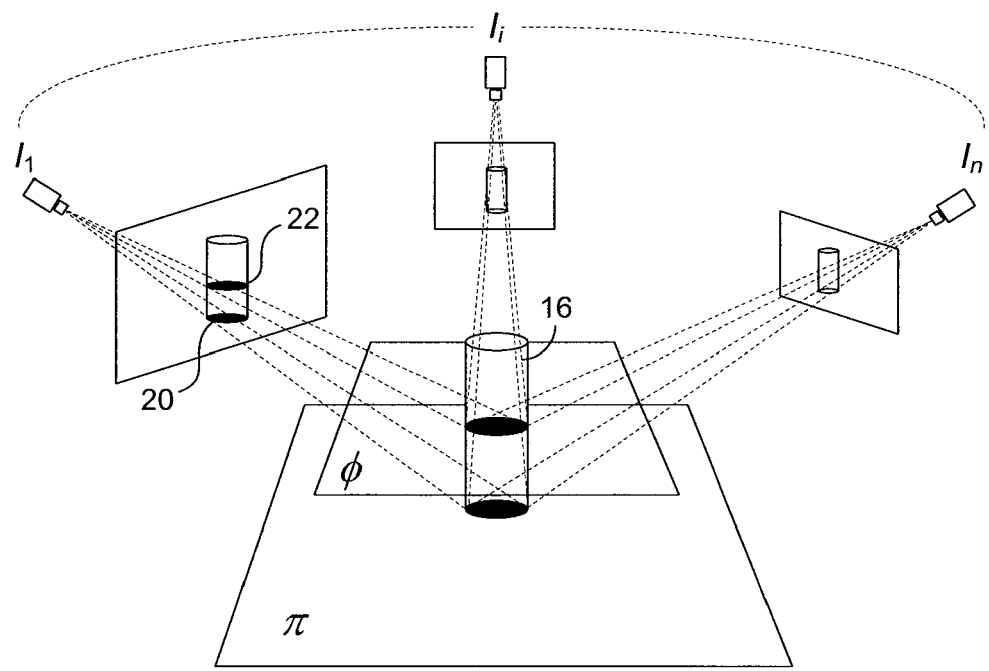
FIG. 2B is a diagram that schematically illustrates warping silhouettes of an object to a reference view using a planar homography induced by a second plane parallel to the first plane of FIG. 2A.

Each value in $\theta_{ref}$ identifies the likelihood of a grid location being inside the body of the object, indeed representing a slice of the object cut out by plane $\pi$. It should be noted that the choice of reference view is irrelevant, as the slices obtained on all image planes and the scene plane $\pi$ are projectively equivalent. This computation can be performed at an arbitrary number of planes in the scene, each giving a new slice of the object. Naturally, this does not apply to planes that do not pass through the object's body, since visual hull intersection on these planes will be empty. FIG. 2B demonstrates a second plane $\phi$ and a second slice 22 of the cylinder 16.

Starting with a reference plane in the scene (typically the ground plane), visual hull intersection can be performed on successively parallel planes in the up direction along the body of the object. The probabilistic occupancy grids $\theta_i$s obtained in this fashion can be thresholded to obtain object slices, but this creates the problem of finding the optimum threshold at each slice level. Moreover, the slices have a strong dependency on each other as they are parts of the same object(s), and should as such be treated as a whole. This dependency can be modeled by stacking the slices, creating a three dimensional data structure $\oplus = [\theta_1; \theta_2; \ldots \theta_n]$. $\oplus$ is not an entity in the three-dimensional world or a collection of voxels. It is, simply put, a logical arrangement of planar slices representing discrete samplings of the continuous occupancy space. Object structure is then segmented out from $\oplus$, i.e., simultaneously segmented out from all the slices as a smooth surface that divides the space into the object and background. Discussed in the following paragraphs is an image-based approach using the homography of a reference plane in a scene to compute homographies induced between views by planes parallel to the reference plane.

Consider a coordinate system XYZ in space. Let the origin of the coordinate frame lie on the reference plane, with the X and Y axes spanning the plane. The Z axis is the reference direction, which is thus any direction not parallel to the plane. The image coordinate system is the usual xy affine image frame, and a point X in space is projected to the image point x via a 3×4 projection matrix M as:

$$x = MX = [m_1 m_2 m_3 m_4]X, \qquad [\text{Equation 2}]$$

where x and X are homogenous vectors in the form: $x=(x,y,w)^T$, $X=(X,Y,Z,W)^T$, and "=" means equality up to scale. The projection matrix M can be parameterized as:

$$M = [v_X v_Y v_Z \hat{l}], \qquad [\text{Equation 3}]$$

where $v_X$, $v_Y$, and $v_Z$ are the vanishing points for X, Y, and Z directions respectively and $\hat{l}$ is the vanishing line of the reference plane normalized.

Figure 3:
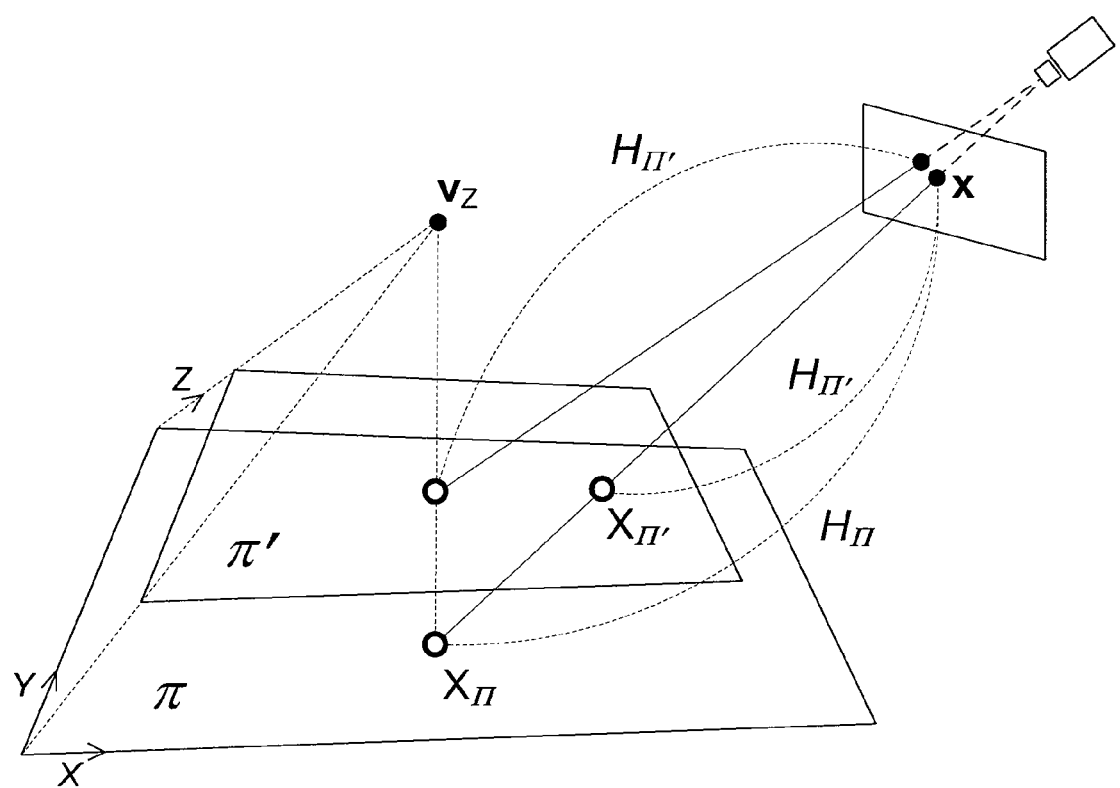
FIG. 3 is a diagram that illustrates the geometrical relationship of the homography of an image plane to two parallel scene planes.

Suppose the world coordinate system is translated from the plane $\pi$ onto the plane $\pi'$ along the reference direction (Z) by z units as shown in FIG. 3, then a new projection matrix M' can be parameterized as:

$$M' = [v_X v_Y v_Z \alpha z v_z + \hat{l}], \qquad [\text{Equation 4}]$$

where $\alpha$ is a scale factor. Columns 1, 2, and 4 of the projection matrices are the three columns of the respective plane to image homographies. Therefore, the plane-to-image homographies can be extracted from the projection matrices, ignoring the third column, to give:

$$H_\pi = [v_X v_Y \hat{l}], H'_\pi = [v_X v_Y \alpha z v_Z + \hat{l}]. \qquad [\text{Equation 5}]$$

In general:

$$H_Y = H_{ref} + [0|\gamma v_{ref}], \qquad [\text{Equation 6}]$$

where $H_{ref}$ is the homography of the reference plane, $\gamma$ is a scalar multiple encapsulating $\alpha$ and z, [0] is a 3×2 matrix of zeros, and $v_{ref}$ is the vanishing point of the reference direction. Using this result it can be shown that if the homography $H_{i,j}$ is induced by a reference scene plane $\pi$ between views i and j, then the homography $H_{i,j}$ induced by a plane $\phi$ parallel to $\pi$ in the reference direction is given by:

$$H_{i\varphi j} = (H_{i\pi j} + [0 \mid yv_{ref}])\left(I_{3\times 3} - \frac{1}{1+y}[0 \mid yv_{ref}]\right). \quad \text{[Equation 7]}$$

As described above, slices computed along the body of the object can be stacked to create a three dimensional data structure $\oplus$ that encapsulates the object structure. To segment out the object, a parameterized surface $S(q):[0,1]R^3 \rightarrow$ can be evolved that divides $\oplus$ between the object and the background. This is achieved by formulating the problem in a variational framework, where the solution is a minimizer of a global cost functional that combines a smoothness prior on slice contours and a data fitness score. The function can be defined as:

$$E(S) = \int_S g(|\nabla\Theta(S(q))|)^2 \, dq + \int_S \left|\frac{\partial S(q)}{\partial q}\right|^2 dq, \quad \text{[Equation 8]}$$

where $\nabla\oplus$ denotes gradient of $\oplus$, and g denotes a strictly decreasing function: $g(x)=1/(1+x^2)$. The first term at the right side of Equation 8 represents external energy. Its role is to attract the surface towards the object boundary in $\oplus$. The second term, called the internal energy, computes the area of the surface. Given the same volume, a smoother surface will have a smaller area. Therefore, this term controls the smoothness of the surface to be determined. When the overall energy is minimized, the object boundary will be approached by a smooth surface.

Minimizing Equation 8 is equivalent to computing geodesic in a Riemannian space:

$$E(S) = \int g(|\nabla\Theta(S)|)\left|\frac{\partial S}{\partial q}\right| dq. \quad \text{[Equation 9]}$$

With the Euler-Lagrange equation deduced, this objective function can be minimized by using the gradient descent method by an iteration time t as $$\vec{S}_t = g(|\nabla\oplus(S)|)\kappa\vec{N} - (\nabla g(|\nabla\oplus(S)|))\cdot\vec{N})\cdot\vec{N}, \quad \text{[Equation 10]}$$

where $\kappa$ is the surface curvature, and $\vec{N}$ is the unit normal vector of the surface. Since the objects to be reconstructed may have arbitrary shape and/or topology, the segmentation is implemented using the level set framework. Level sets-based methods allow for topological changes to occur without any additional computational complexity, because an implicit representation of the evolving surface is used. The solution (Equation 10) can be readily cast into level set framework by embedding the surface S into a three-dimensional level set function $\psi$ with the same size as $\oplus$, i.e., $S=\{(x,y,z) \mid \psi(x,y,z)=0\}$. The signed distance transform is used to generate the level set function. This yields an equivalent level set update equation to the surface evolution process in Equation 10:

$$\frac{\partial\Psi}{\partial t} = g(|\nabla\Theta|)\kappa|\nabla\Psi| + \nabla g(|\nabla\Theta|)\nabla\Psi. \quad \text{[Equation 11]}$$

Starting with an initial estimate for S and iteratively updating the level set function using Equation 11 leads to a segmentation of the object.

Application of the Modeling Approach

Application of the above-described approach will now be discussed with reference to the flow diagram of FIGS. 4A and 4B, as well as FIGS. 5-8. More particularly, discussed is an example embodiment for a method of three-dimensionally modeling an object. Beginning with block 30 of FIG. 4A, multiple images of an object within a scene are captured from multiple different viewpoints to obtain multiple views of the object. The images can be captured by multiple cameras, for example positioned in various fixed locations surrounding the object. Alternatively, the images can be captured using a single camera. In the single camera case, the camera can be moved about the object in a "flyby" scenario, or the camera can be fixed and the object can be rotated in front of the camera, for example on a turntable. Irrespective of the method used to capture the images, the views are preferably uniformly spaced through 360 degrees to reduce reconstruction artifacts. Generally speaking, the greater the number of views that are obtained, the more accurate the reconstruction of the object. The number of views that are necessary may depend upon the characteristics of the object. For instance, the greater the curvature of the object, the greater the number of views that will be needed to obtain desirable results.

Figure 5:
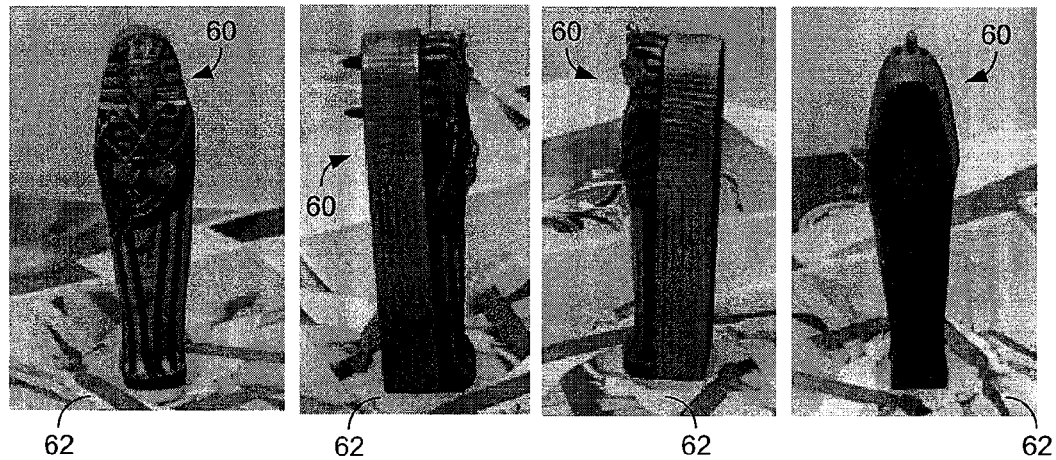
FIG. 5 comprises four images of an object captured from different viewpoints.

FIG. 5 illustrates four example images of an object 60, in this case a replica of an ancient Egyptian coffin. Each of the images of FIG. 5 represents a different view of the object 60, specifically a front view, a right side view, a left side view, and a rear view. In an experiment conducted using the illustrated object 60, 30 views were obtained using a single camera that was moved about the object in a flyby. As indicated in the images, the object 60 is supported by a support surface 62, which may be referred to as the ground plane. As is apparent from each of the images, the ground plane 62 has a visual texture that comprises optically detectable features that can be used for feature correspondence between the various views during visual hull intersection. The particular nature of the texture is of relatively little importance, as long as it comprises an adequate number of detectable features. Therefore, the texture can be an intentional pattern, whether it be a repeating or non-repeating pattern, or a random pattern.

Figure 4A:
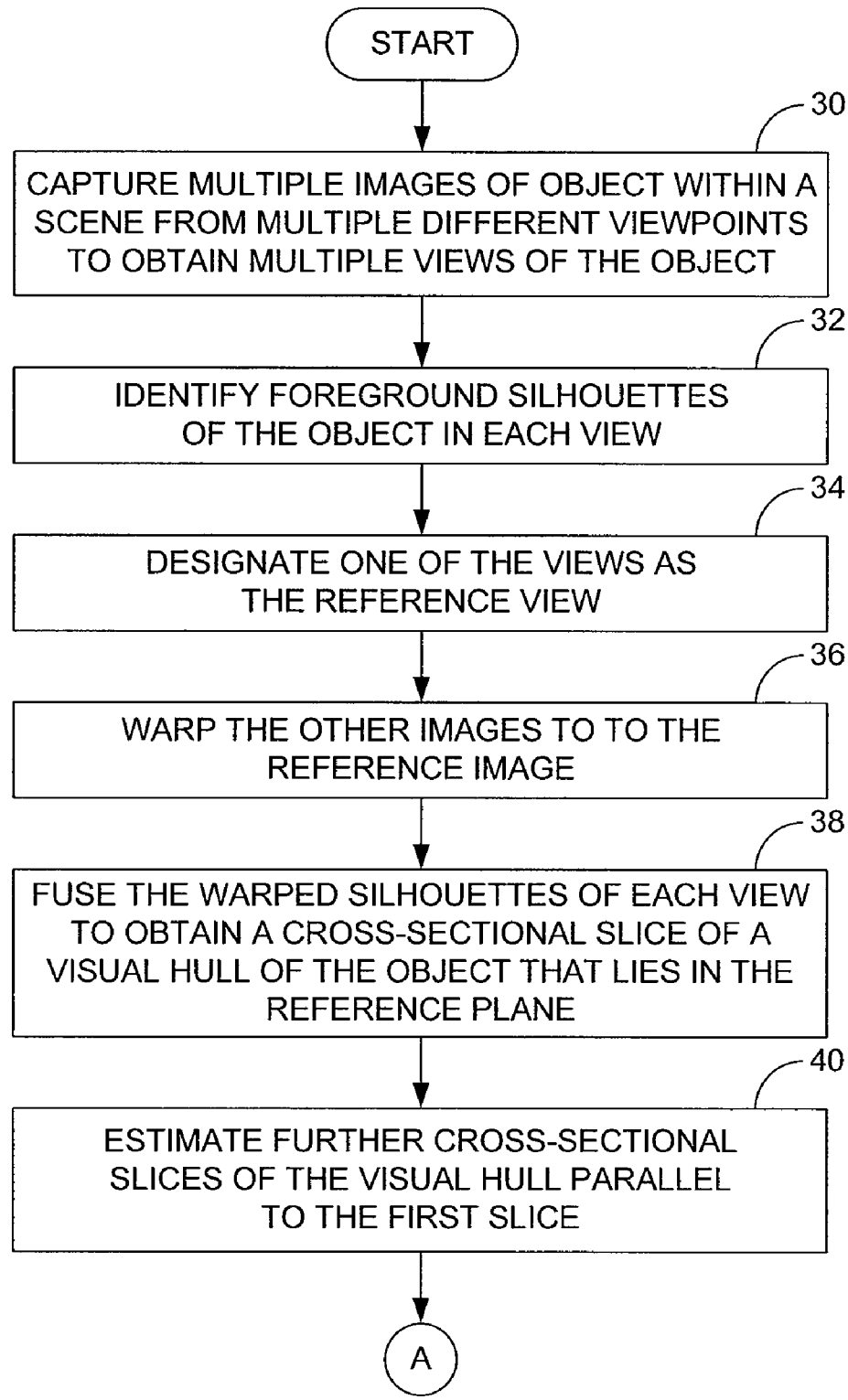
FIGS. 4A and 4B together comprise a flow diagram that illustrates an embodiment of a method for three-dimensional modeling.
Figure 4B:
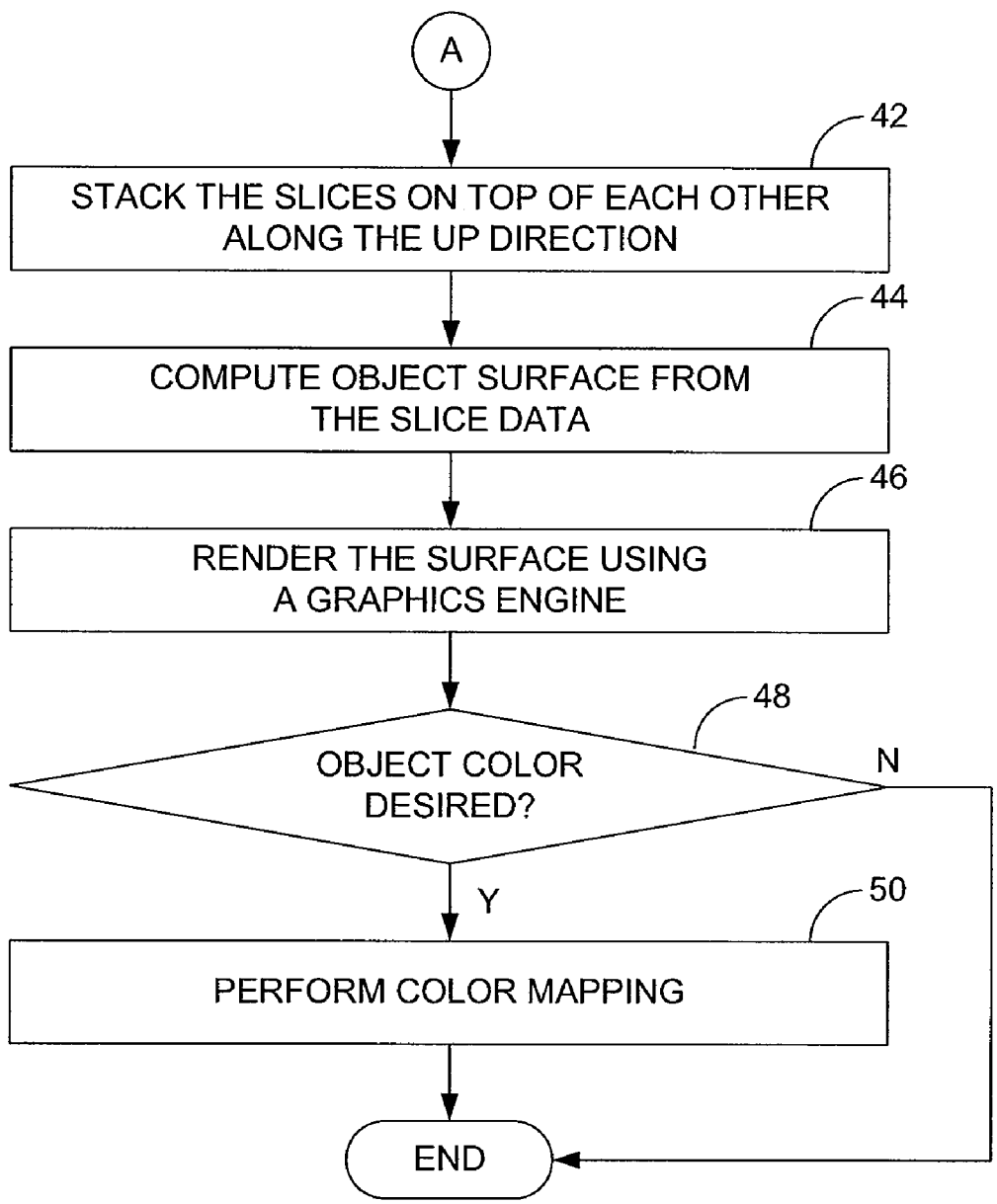

Once all the desired views have been obtained, the foreground silhouettes of the object in each view are identified, as indicated in block 32 of FIG. 4A. The purpose for identifying the foreground silhouettes is to limit the amount of image data that will be processed to the data at the boundaries of the object in each view. The manner in which the silhouettes are identified may depend upon the manner in which the images were captured. For example, if the images were captured with a single or multiple stationary cameras, identification of the silhouettes can be achieved through image subtraction. To accomplish this, images can be captured of the scene from the various angles from which the images of the object were captured but without the object present in the scene. Then the images with the object present can be compared to those without the object present as to each view to identify the boundaries of the object in every view.

Image subtraction typically cannot be used, however, in cases in which the images were captured by a single camera in a random flyby of an object given that it is difficult to obtain the same viewpoint of the scene without the object present. In such a situation, image alignment can be performed to identify the foreground silhouettes. Although consecutive views can be placed in registration with each other by aligning the images with respect to detectable features of the ground plane, such registration results in the image pixels that correspond to the object being misaligned due to plane parallax. This misalignment can be detected by performing a photo-consistency check, i.e., comparing the color values of two consecutive aligned views. Any pixel that has a mismatch from one view to the other (i.e., the color value difference is greater than a threshold) is marked as a pixel pertaining to the object. The alignment between such views can be determined, by finding the transformation, i.e., planar homography, between the views. In some embodiments, the homography can be determined between any two views by first identifying features of the ground plane using an appropriate algorithm or program, such as scale invariant feature transform (SIFT) algorithm or program. Once the features have been identified, the features can be matched across the views and the homographies can be determined in the manner described in the foregoing. By way of example, at least four features are identified to align any two views. In some embodiments, a suitable algorithm or program, such as a random sample consensus (RANSAC) algorithm or program, can be used to ensure that the identified features are in fact contained within the ground plane.

Once the foreground silhouettes have been identified in each view, visual hull intersection can be performed on multiple planes that cut through the object. Through that process, multiple slices of the object can be estimated, and those slices can then be used to compute a surface that approximates the outer surface of the object. As described above, the visual hull intersection begins with a reference plane. For purposes of this discussion, it is assumed that the reference plane is the ground plane.

With reference to block 34 of FIG. 4A, one of the obtained views is designated as the reference view. Next, each of the other views is warped to the reference view relative to the reference plane, as indicated in block 36. That is, the various views are transformed by obtaining the planar homography between each view and the reference view that is induced by the reference plane (i.e., the ground plane). Notably, those homographies can be obtained by determining the homographies between consecutive views and concatenating each of those homographies to produce the homography between each of the views and the reference view. Such a process may be considered preferable given that it may reduce error that could otherwise occur when homographies are determined between views that are spaced far apart from each other.

After each of the views, and their silhouettes, has been transformed (i.e., warped to the reference view using the planar homography), the warped silhouettes of each view are fused together to obtain a cross-sectional slice of a visual hull of the object that lies in the reference plane, as indicated in block 38. That is, a first slice of the object (i.e., a portion of the object that is occluded from view) that is present at the ground plane is estimated.

As described above, this process can be replicated to obtain further slices of the object that lie in planes parallel to the reference plane. Given that those other planes are imaginary, and therefore comprise no identifiable features, the transformation used to obtain the first slice cannot be performed to obtain the other slices. However, because the homographies induced by the reference plane and the location of the vanishing point in the up direction are known, the homographies induced by any plane parallel to the reference plane can be estimated. Therefore, each of the views can be warped to the reference view relative to new planes, and the warped silhouettes that result can be fused together to estimate further cross-sectional slices of the visual hull, as indicated in block 40.

As described above, the homographies can be estimated using Equation 7. In that equation, $\gamma$ is a scalar multiple that specifies the locations of other planes along the up direction. Notably, the value for $\gamma$ can be selected by determining the range for $\gamma$ that spans the object. This is achieved by incrementing $\gamma$ in Equation 7 until a point is reached at which there is no shadow overlap, indicating that the current plane is above the top of the object. Once the range has been determined, the value for $\gamma$ at that point can be divided by the total number of planes that are desired to determine the appropriate value of $\gamma$ to use. For example, if $\gamma$ is 10 at the top of the object and 100 planes are desired, $\gamma$ can be set to 0.1 to obtain the homographies induced by the various planes.

Figure 6:
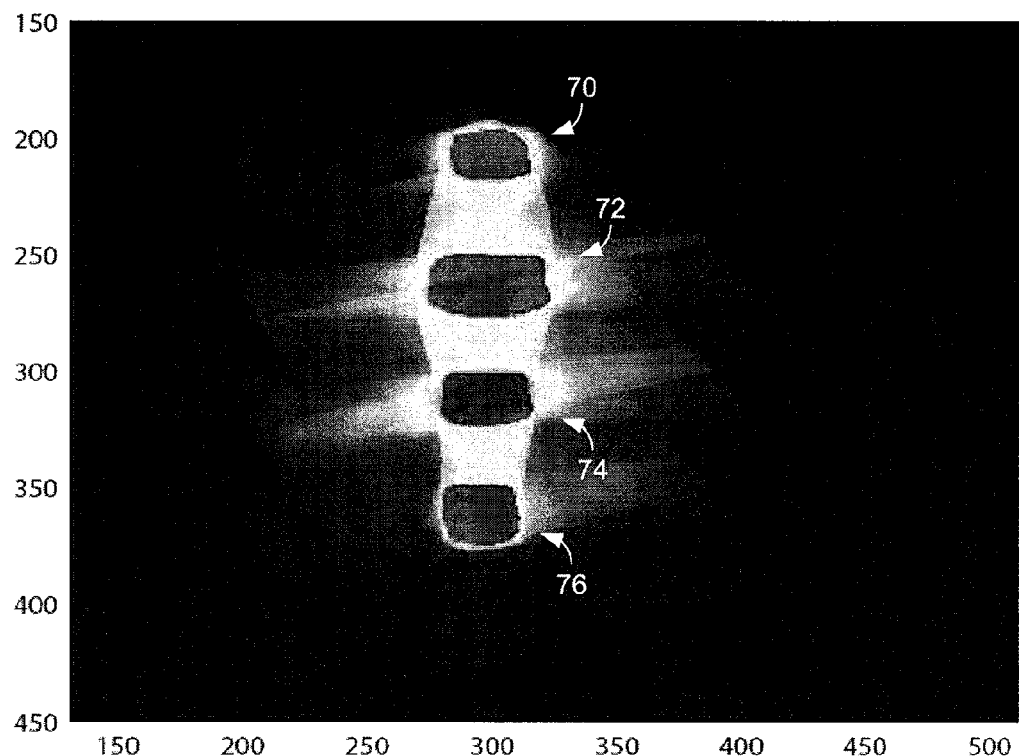
FIG. 6 is a view of four estimated object slices superimposed onto the outline of the object of FIG. 5

At this point in the process, multiple slices of the object have been estimated. FIG. 6 illustrates four example slices, slices 70-76, which have been superimposed over the outline of the object 60 from FIG. 5. As with the number of views, the greater the number of slices, the more accurate the results that can be obtained. In the experiment performed with the object 60, 200 slices were estimated.

Once the slices have been estimated, their precise boundaries are still unknown and, therefore, the precise boundaries of the object are likewise unknown. One way in which the boundaries of the slices could be determined is to establish thresholds for each of the slices to separate image data considered part of the object from image data considered part of the background. In the current embodiment, however, the various slices are first stacked on top of each other along the up direction, as indicated in block 42 of FIG. 4B to generate a three-dimensional "box" (i.e., the data structure $\oplus$) that encloses the object and the background. At that point, a surface can be computed that divides the three-dimensional box into the object and the background to segment out the object surface. In other words, an object surface can be computed from the slice data, as indicated in block 44 of FIG. 4B.

As described above, the surface can be computed by minimizing Equation 8, which comprises a first term that identifies portions of the data that have high gradient (thereby identifying the boundary of the object) and the second term identifies the surface area of the object surface. By minimizing both terms, the surface is optimized as a surface that moves toward the object boundary and has as small a surface area as possible. In other words, the surface is optimized to be the tightest surface that divides the three-dimensional surface of the object from the background.

Figure 7:
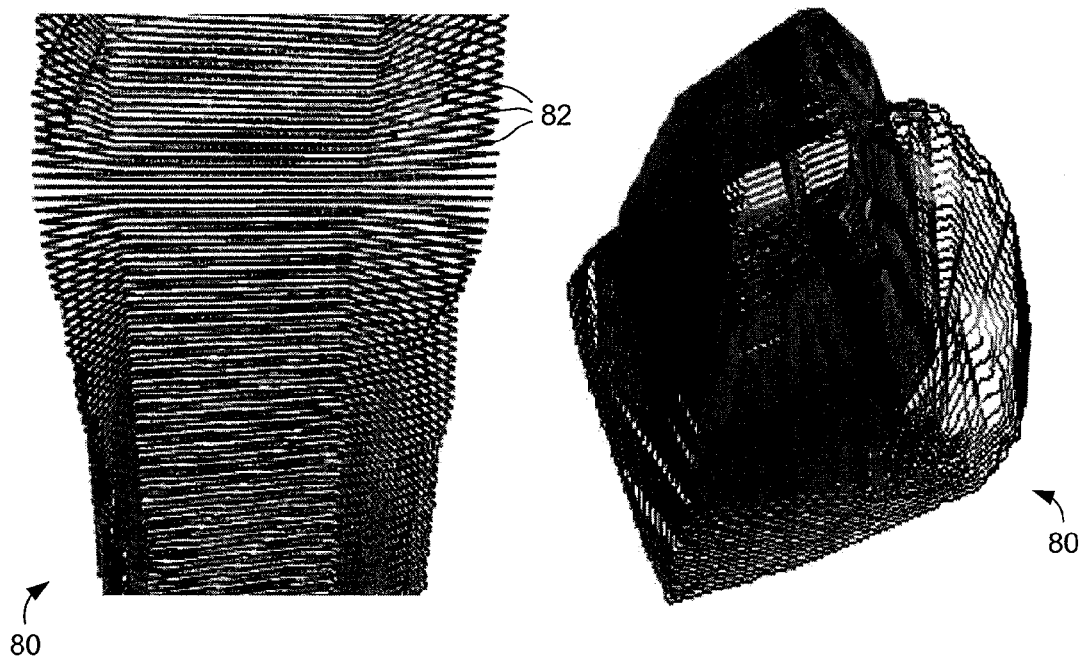
FIG. 7 comprises two views of an object structure comprised of segmented object slices obtained for the object of FIG. 5 after rendering with a point rendering algorithm.

After the object surface has been computed, the three-dimensional locations of points on the surface are known and, as indicated in block 46, the surface can be rendered using a graphics engine. FIG. 7 illustrates an object structure 80, comprised of parallel segmented slices 82, that results when such rendering is performed. In FIG. 7, the left image is a close up of a side of the object 60 and the right image is a view of the object from its bottom looking upward.

Figure 8:
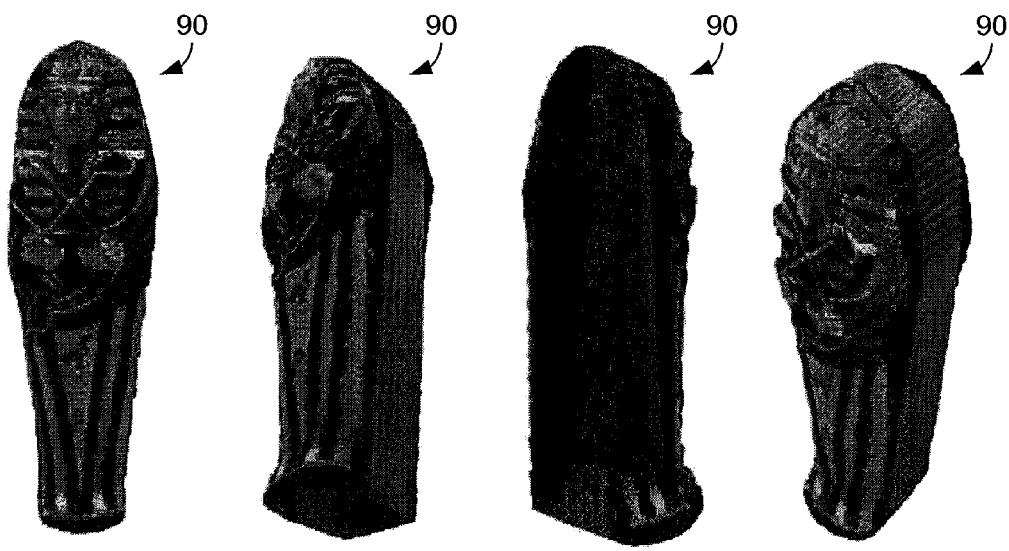
FIG. 8 comprises four zoomed-out views of the object structure of FIG. 7.

At this point, a three-dimensional model of the object has been produced, which can be used for various purposes, including object localization, object recognition, and motion capture. It can then be determined whether the colors of the object are desired, as indicated in decision block 48 of FIG. 4B. If not, flow for the process is terminated. If so, however, the process continues to block 50 at which color mapping is performed. In some embodiments, color mapping can be achieved by identifying the color values for the slices from the outer edges of the slices, which correspond to the outer surface of the object. A visibility check can be performed to determine which of the pixels of the slices pertain to the outer edges. Specifically, pixels within discrete regions of the slices can be "moved" along the direction of the vanishing point to determine if the pixels move toward or away from the center of the slice. The same process is performed for the pixels across multiple views and, if the pixels consistently move toward the center of the slice, they can be assumed to comprise pixels positioned along the edge of the slice and, therefore, at the surface of the object. In that case, the color values associated with those pixels can be applied to the appropriate locations on the rendered surface. FIG. 8 illustrates the result of such a process in the form of four views of a color-mapped, rendered surface 90 that represents the three-dimensional structure of the object 60. Notably, the surface 90 is formed of the various segmented slices 82 shown in FIG. 7, although the slices are not individually apparent at level of zoom shown in FIG. 8.

Example System

Figure 9:
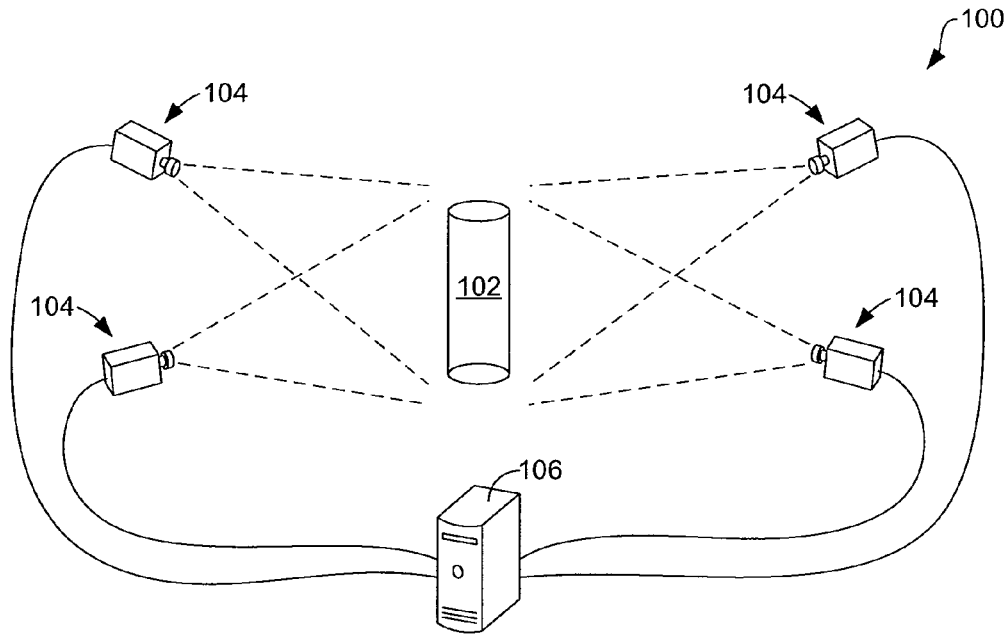
FIG. 9 is a schematic view of a system for three-dimensional modeling.

FIG. 9 illustrates an example system 100 that can be used to perform three-dimensional modeling of objects, such as example object 102. As indicated in that figure, the system 100 comprises at least one camera 104 that is communicatively coupled (either with a wired or wireless connection) to a computer system 106. Although the computer system 106 is illustrated in FIG. 9 as a single computing device, the computing system can comprise multiple computing devices that work in conjunction to perform or assist with the three-dimensional modeling.

Figure 10:
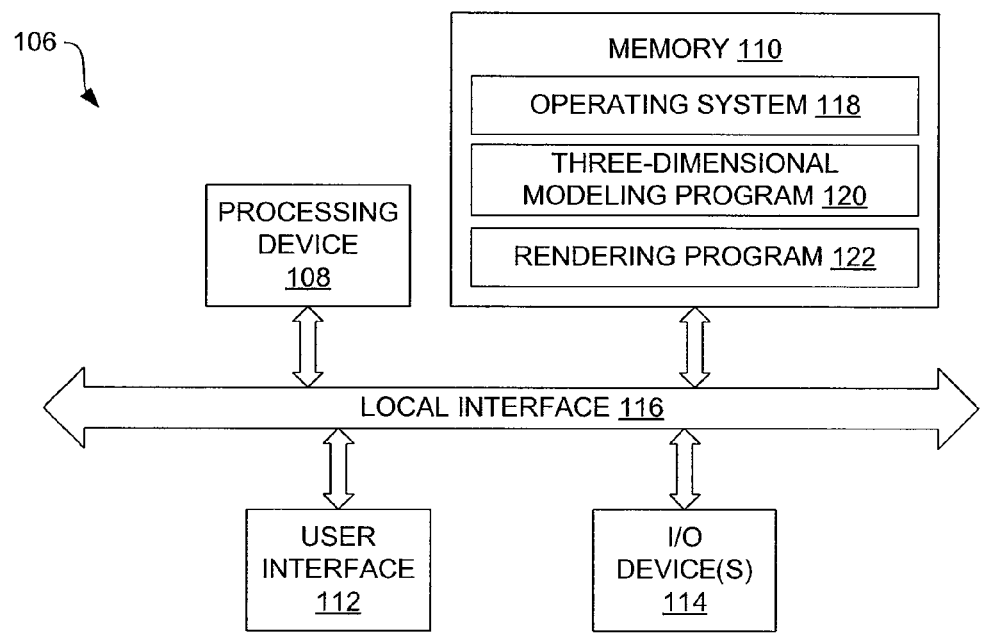
FIG. 10 is block diagram of an example architecture for a computer system illustrated in FIG. 9.

FIG. 10 illustrates an example architecture for the computer system 106. As indicated in FIG. 10, the computer system 106 comprises a processing device 108, memory 110, a user interface 112, and at least one input/output (I/O) device 114, each of which is connected to a local interface 116.

The processing device 108 can comprise a central processing unit (CPU) that controls the overall operation of the computer system 106 and one or more graphics processor units (GPUs) for graphics rendering. The memory 110 includes any one of or a combination of volatile memory elements (e.g., RAM) and nonvolatile memory elements (e.g., hard disk, ROM, etc.) that store code that can be executed by the processing device 108.

The user interface 112 comprises the components with which a user interacts with the computer system 106. The user interface 112 can comprise conventional computer interface devices, such as a keyboard, a mouse, and a computer monitor. The one or more I/O devices 114 are adapted to facilitate communications with other devices and may include one or more communication components such as a modulator/demodulator (e.g., modem), wireless (e.g., radio frequency (RF)) transceiver, network card, etc.

The memory 110 (i.e., a computer-readable medium) comprises various programs (i.e., logic) including an operating system 118 and three-dimensional modeling system 120. The operating system 118 controls the execution of other programs and provides scheduling, input-output control, file and data management, memory management, and communication control and related services. The three-dimensional modeling system 120 comprises one or more algorithms and/or programs that are used to model a three-dimensional object from two-dimensional views in the manner described in the foregoing. Furthermore, memory 110 comprises a graphics rendering program 122 used to render surfaces computed using the three-dimensional modeling system 120.

Various code (i.e., logic) has been described in this disclosure. Such code can be stored on any computer-readable medium for use by or in connection with any computer-related system or method. In the context of this document, a "computer-readable medium" is an electronic, magnetic, optical, or other physical device or means that contains or stores code, such as a computer program, for use by or in connection with a computer-related system or method. The code can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

We claim:

1. A method for modeling a three-dimensional object, the method comprising:
   capturing two-dimensional images of the object from multiple different viewpoints to obtain multiple views of the object;
   estimating slices of the object that lie in parallel planes that cut through the object; and
   computing a three-dimensional data structure that represents the object and its background from the estimated slices by stacking the estimated slices on top of each other along an up direction of the object.

2. The method of claim 1, wherein estimating slices comprises identifying foreground silhouettes of the object in each view.

3. The method of claim 2, wherein estimating slices further comprises designating one of the views as the reference view.

4. The method of claim 3, wherein estimating slices further comprises warping each view other than the reference view to the reference view to obtain warped silhouettes.

5. The method of claim 4, wherein warping comprises determining the planar homography between each other view and the reference view that is induced by a ground plane upon which the object is supported.

6. The method of claim 5, wherein estimating slices further comprises fusing the warped silhouettes to obtain a cross-sectional slice of a visual hull of the object that lies in the ground plane.

7. The method of claim 6, wherein estimating slices further comprises estimating planar homographies induced by additional planes parallel to the ground plane using the planar homographies induced by the ground plane and the location of the vanishing point in the up direction of the object.

8. The method of claim 7, wherein estimating slices further comprises, as to each additional plane, warping each view to the reference view relative to the additional plane to obtain warped silhouettes and fusing the warped silhouettes to obtain a further cross-sectional slice of the visual hull of the object.

9. The method of claim 1, wherein computing a three-dimensional data structure comprises dividing the object from the background in the three-dimensional data structure to segment out the surface of the object.

10. The method of claim 9, wherein dividing the object from the background comprises minimizing an energy function over the object surface.

11. The method of claim 1, further comprising rendering the object surface.

12. The method of claim 11, further comprising color mapping the rendered object surface.

13. A method for modeling a three-dimensional object, the method comprising:
   capturing two-dimensional images of the object from multiple different viewpoints to obtain multiple views of the object;
   identifying foreground silhouettes of the object in each view;
   designating one of the views as the reference view;
   warping each view other than the reference view to the reference view relative to a ground plane upon which the object is supported to obtain warped silhouettes;
   fusing the warped silhouettes to obtain a first cross-sectional slice of a visual hull of the object that lies in the ground plane;

estimating further cross-sectional slices of the visual hull that lie in additional planes above and parallel to the ground plane;

stacking the cross-sectional slices on top of each other along an up direction of the object to create a three-dimensional data structure that represents the object and its background; and computing an object surface from the data structure by minimizing an energy function for the data structure.

14. The method of claim 13, wherein warping comprises determining the planar homography between each view and the reference view that is induced by the ground plane.

15. The method of claim 14, wherein estimating further cross-sectional slices comprises estimating planar homographies induced by the additional planes using the planar homographies induced by the ground plane and the location of the vanishing point in the up direction of the object.

16. The method of claim 15, wherein estimating further cross-sectional slices further comprises, as to each additional plane, warping each view to the reference view relative to the additional plane to obtain warped silhouettes and fusing the warped silhouettes to obtain a further cross-sectional slice of the visual hull of the object.

17. The method of claim 14, wherein minimizing an energy function comprises minimizing an energy function that comprises a gradient term and a surface area term.

18. The method of claim 14, further comprising rendering the object surface.

19. The method of claim 14, further comprising color mapping the rendered object surface.

20. A non-transitory computer-readable medium comprising:

logic configured to estimate a slice of an object that lies in a ground plane upon which the object is supported from two-dimensional views of the object;

logic configured to estimate relative to the ground plane further slices of the object that lie in additional planes that are parallel to the ground plane; and logic configured to compute a three-dimensional data structure that represents the object and its background from the estimated slices by stacking the estimated slices on top of each other along an up direction of the object.

21. The non-transitory computer-readable medium of claim 20, further comprising logic configured to warp views to a reference view to obtain warped silhouettes related to the ground plane.

22. The non-transitory computer-readable medium of claim 21, wherein the logic configured to warp is configured to determine planar homographies between the reference view and the other views that are induced by the ground plane.

23. The non-transitory computer-readable medium of claim 22, further comprising logic configured to fuse the warped silhouettes to obtain a cross-sectional slice of a visual hull of the object that lies in the ground plane.

24. The non-transitory computer-readable medium of claim 23, wherein the logic configured to estimate further slices is configured to estimate planar homographies induced by the additional planes using planar homographies induced by the ground plane and the location of the vanishing point in the up direction of the object.

25. The non-transitory computer-readable medium of claim 20, wherein the logic configured to compute a surface is configured to divide the object from the background in the three-dimensional data structure to segment out the surface of the object.

26. The non-transitory computer-readable medium of claim 25, wherein the logic configured to compute a surface is further configured to minimize an energy function over the object surface.

27. The non-transitory computer-readable medium of claim 20, further comprising logic configured to render the object surface.

28. The non-transitory computer-readable medium of claim 20, further comprising logic configured to color map the rendered object surface.

* * * * *